May 7, 1935.  M. H. NEWLIN  2,000,144
MOWING MACHINE
Filed May 5, 1933   6 Sheets-Sheet 6

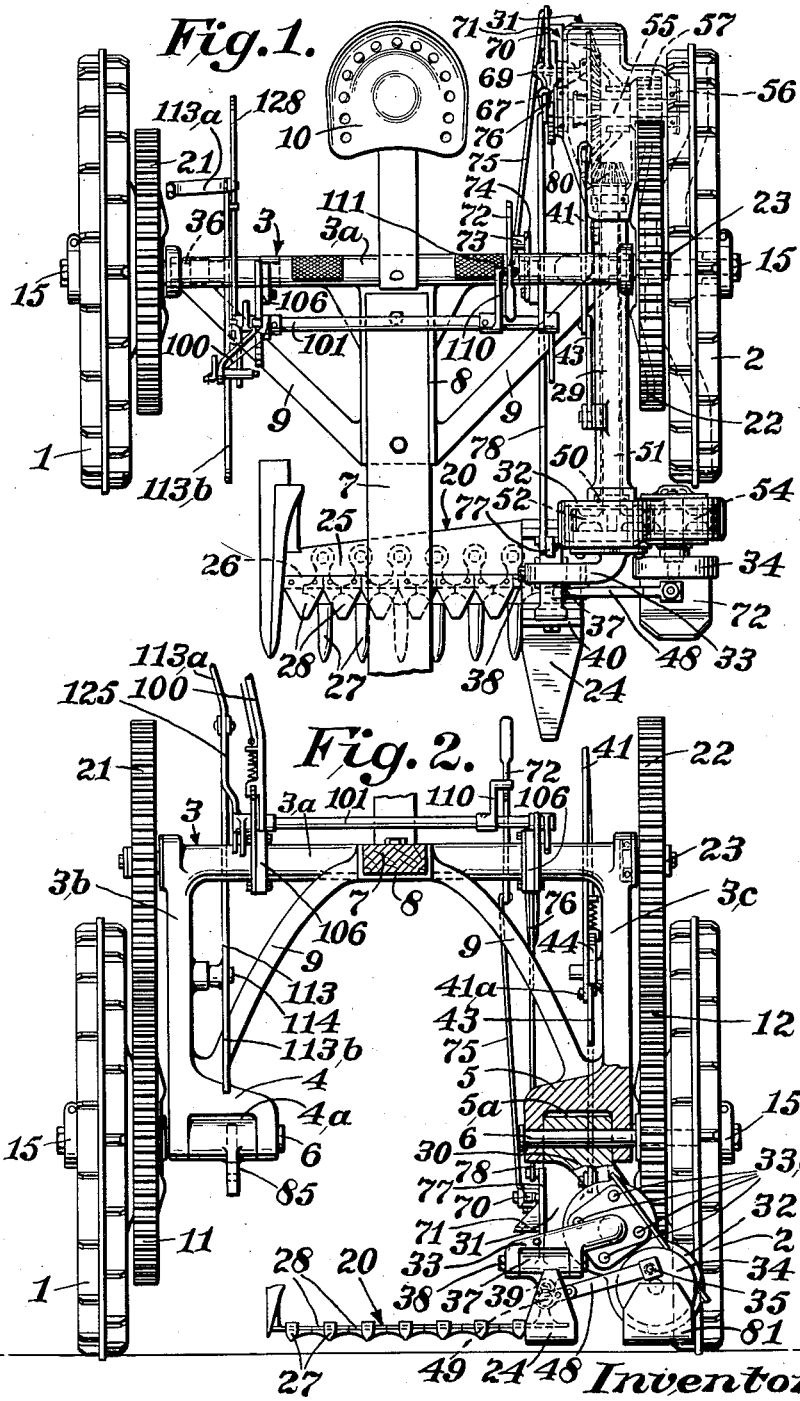

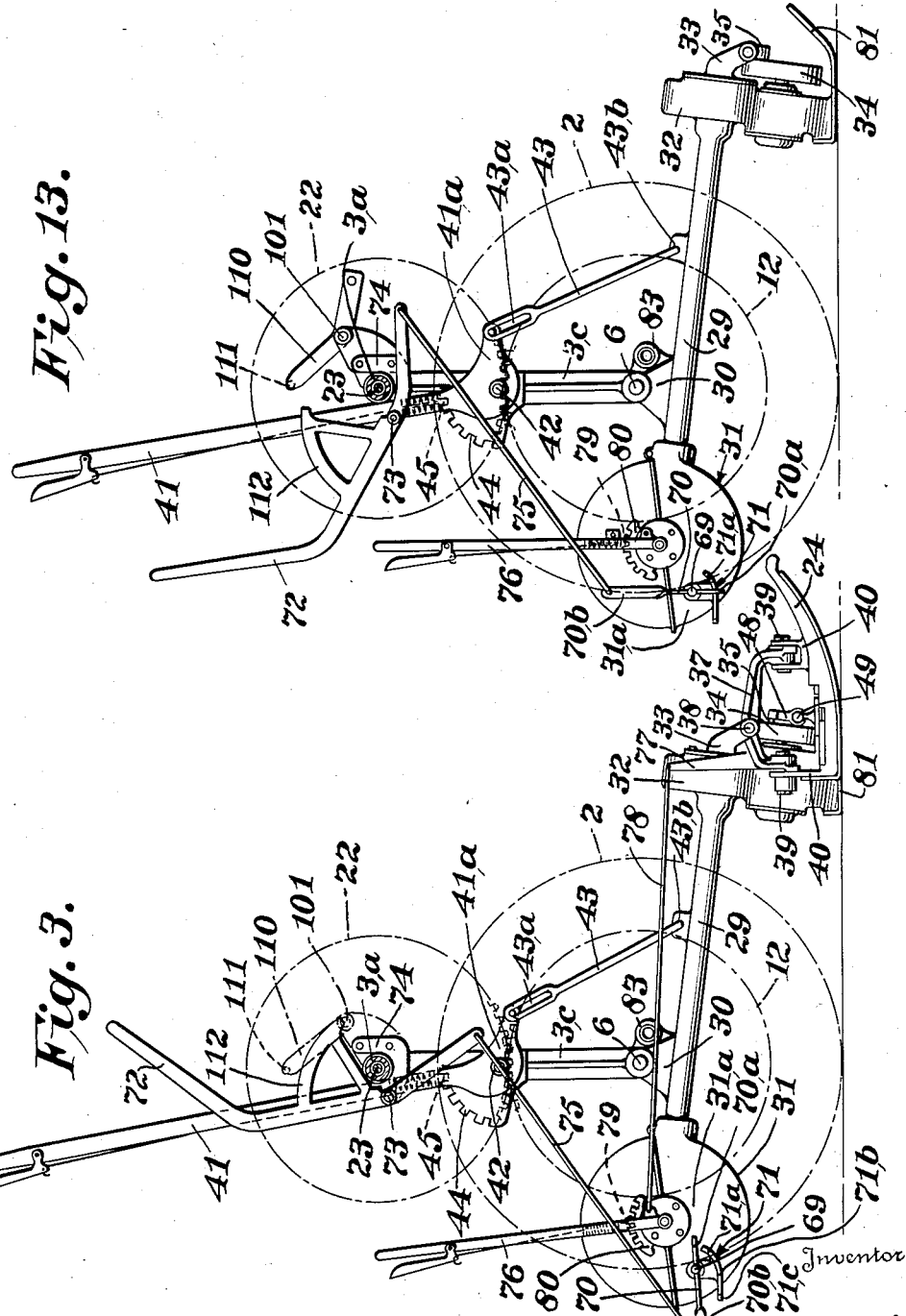

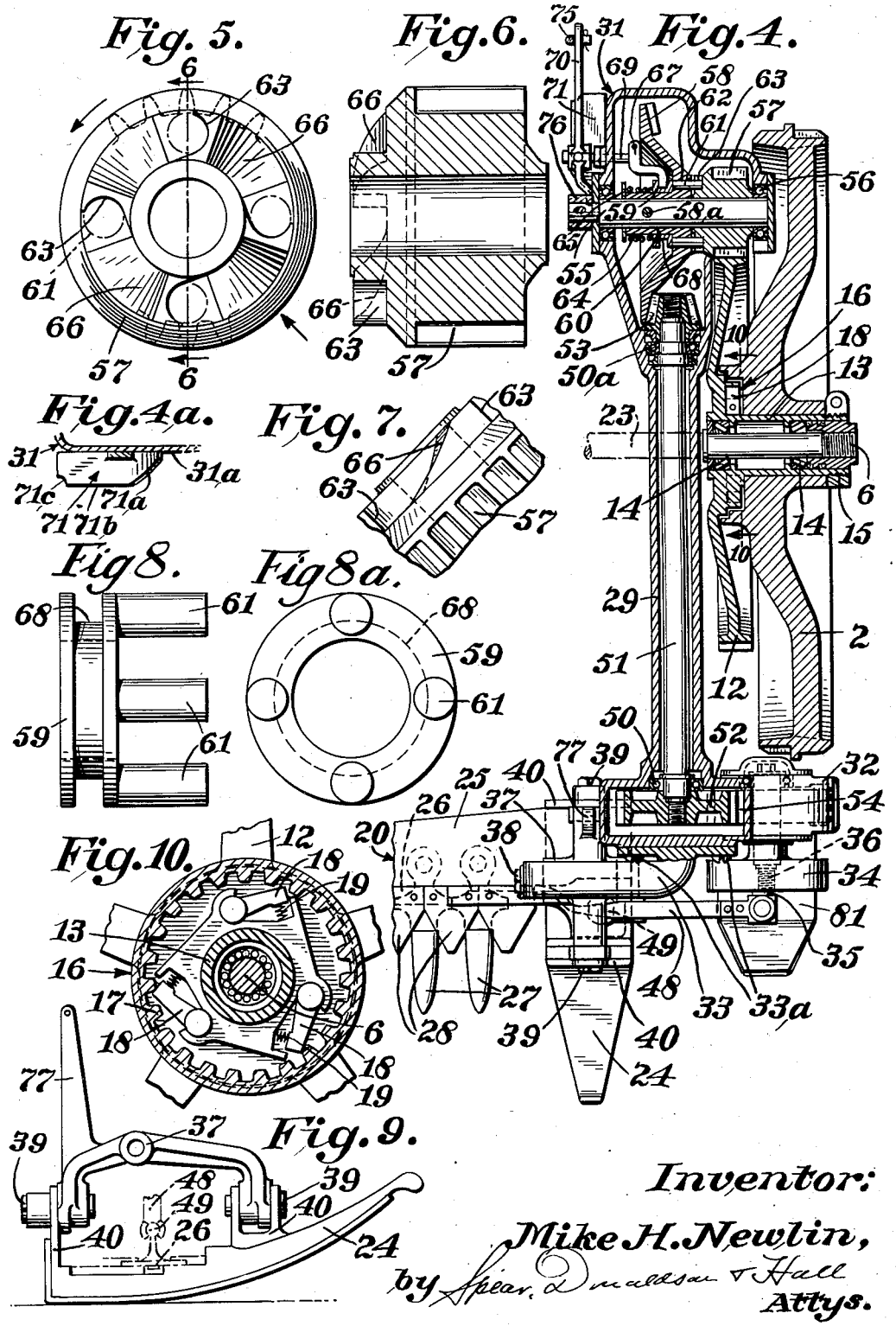

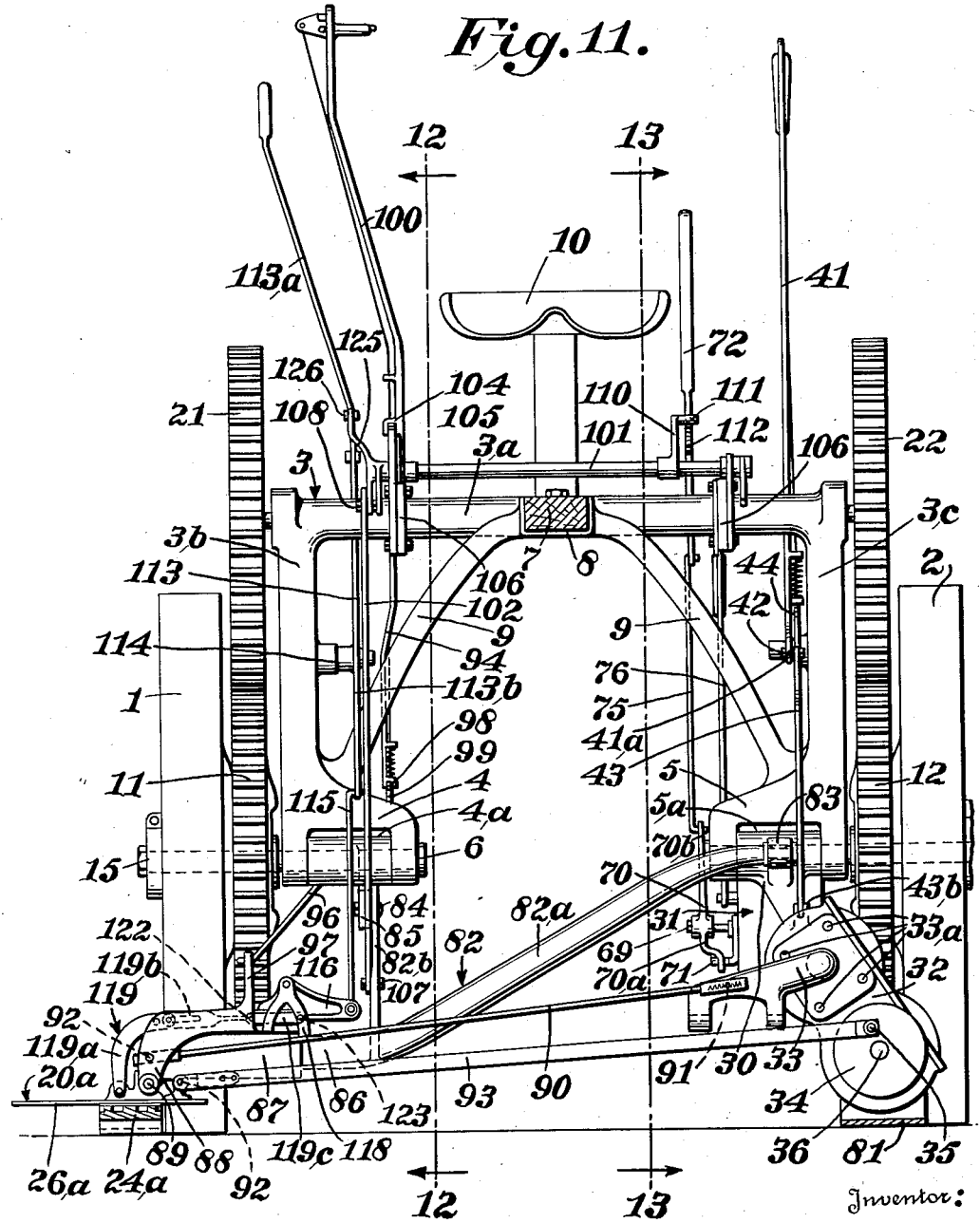

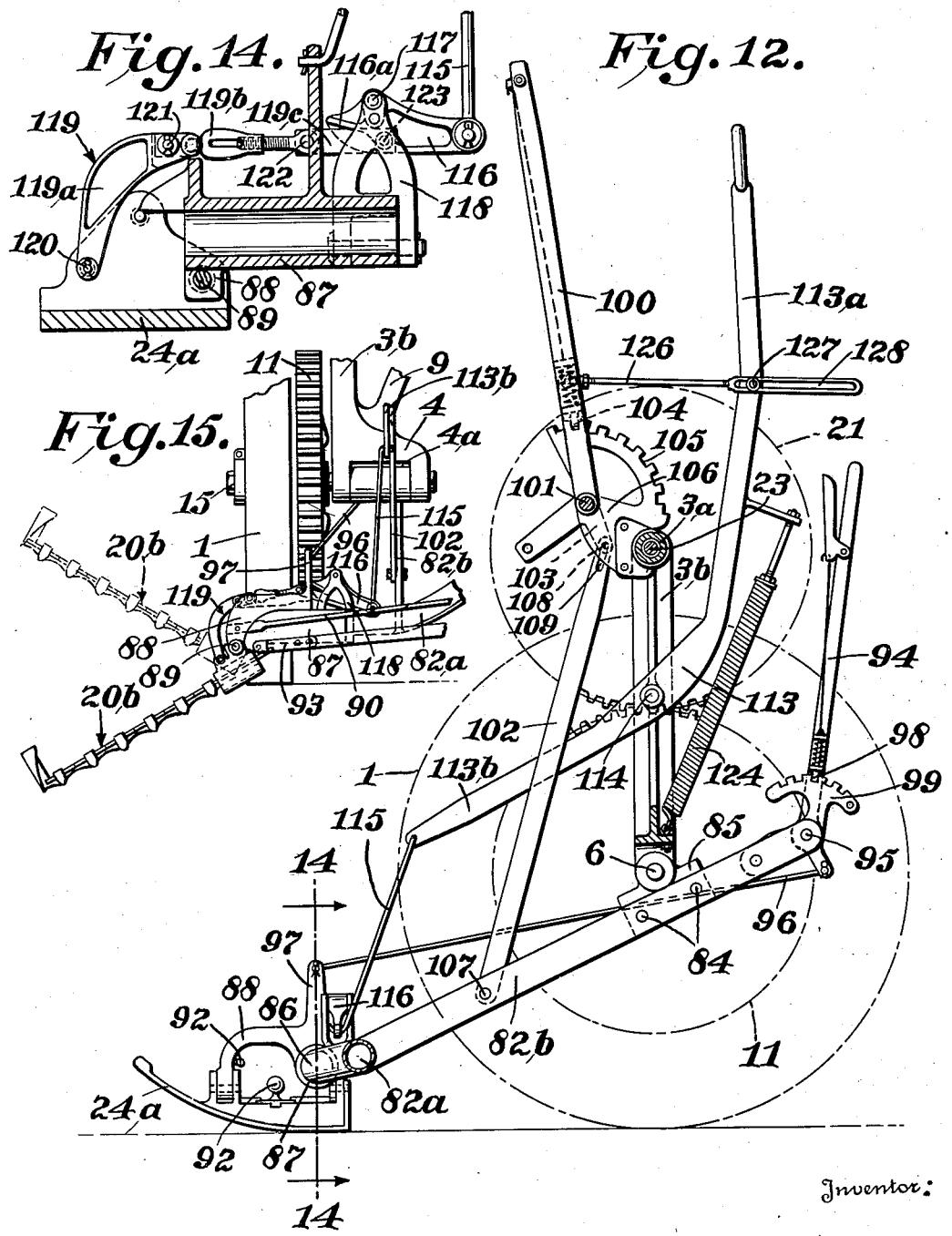

Inventor:
Mike H. Newlin,
By Spear, Duncan & Hall
Attorneys.

Patented May 7, 1935

2,000,144

UNITED STATES PATENT OFFICE 2,000,144

MOWING MACHINE

Mike Holt Newlin, Sanford, N. C., assignor of one-half to Thomas B. Upchurch, Jr., Raeford, N. C., and one-half to Edwards Railway Motor Company, Sanford, N. C., a corporation of North Carolina Application May 5, 1933, Serial No. 669,618

46 Claims. (Cl. 56—272)

This invention relates to an agricultural machine, and has for one of its objects to provide a machine of this character which will embody a wheel supported frame, a cutting unit operating mechanism carried by the frame, a cutting unit adjusting mechanism carried by the frame, and front and side cutting units adapted to be interchangeably mounted on the frame and connected to the operating and adjusting mechanisms, so as to adapt the machine for use as a front or side cutting mowing machine.

The invention has for a further object to provide a machine of the character stated which when adapted for front cutting will be especially useful for harvesting soy beans and other like crops planted between rows of corn.

The invention has for a further object to provide a machine of the character stated which when adapted for side cutting will be capable of being used for any purpose to which a mower may be put.

The invention has for a further object to provide a machine of the character stated which will include a stalk cutting unit adapted to be substituted for the cutting unit on the frame and connected to the adjusting mechanism, the stalk cutting unit being adapted to be carried by the frame for adjustment by said mechanism to vary the cutting power of its cutting elements.

In the drawings:

Fig. 1 is a top plan view of the machine adapted for use as a front cutting mower.

Fig. 2 is a view partly in front elevation and partly in vertical section of the machine.

Fig. 3 is a view partly in vertical section and partly in side elevation of the machine.

Fig. 4 is a view partly in top plan and partly in horizontal section illustrating principally the means for transmitting motion from the traction wheels to the cutter bar of the machine.

Fig. 4a is a plan view of the cam of the ratchet clutch throwout mechanism.

Fig. 5 is an elevational view of one of the gears of the motion transmitting means.

Fig. 6 is a section of the gear taken on the line 6—6 of Fig. 5.

Fig. 7 is a perspective view of a fragmentary portion of the gear.

Fig. 8 shows a clutch element used in connection with the gear, the element being shown in side elevation.

Fig. 8a is a front elevation of Fig. 8.

Fig. 9 is a view in side elevation of the cutter bar shoe.

Fig. 10 is a sectional view illustrating the ratchet by which the traction wheels are connected to the gears forming parts of the cutter bar operating means, the section being taken on the line 10—10 of Fig. 4.

Fig. 11 is a view in front elevation of the machine adapted as an ordinary or side cutting mower.

Fig. 12 is a sectional view taken on the line 12—12 of Fig. 11.

Fig. 13 is a sectional view taken on the line 13—13 of Fig. 11.

Fig. 14 is a sectional view of the means for mounting the side cutter bar on the coupling frame and for folding the cutter bar.

Fig. 15 is a view illustrating the machine equipped with a short cutter bar for cleaning and mowing ditch banks, small terraces and the like, and for cleaning out fence corners and the like, the cutter bar being shown by solid lines in position to clean or mow ditch banks and by broken lines in position to clean or mow terraces.

Figure 16:
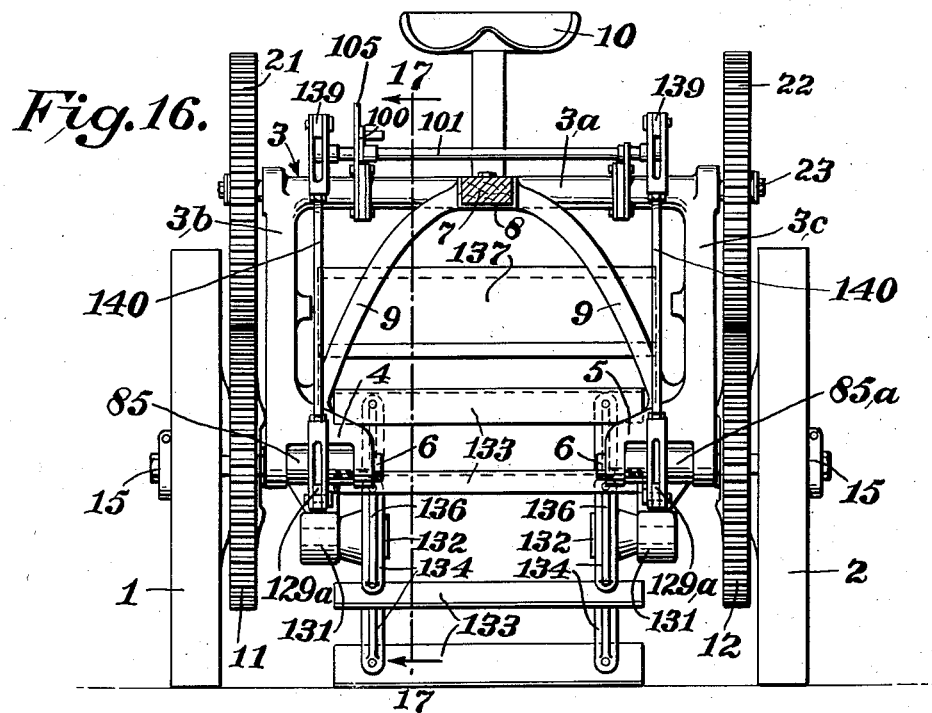
Fig. 16 is a view in front elevation of the machine adapted for use as a stalk cutter.

Referring in detail to the drawings, 1 and 2 designate the traction wheels and 3 the arched frame of the machine. The top bar 3a of the frame 3 is hollow. The side bars 3b and 3c of the frame 3 are provided at their lower ends with forked bearings 4 and 5, respectively, in which are mounted the wheel spindles 6. A tongue 7 has its rear end secured in a socket member 8 which extends forwardly from the frame bar 3a and which is supported at its front end from the bearings 4 and 5 by braces 9. The frame bars 3a, 3b and 3c, the bearings 4 and 5, the socket member 8, and the braces 9 are formed integrally. A seat 10 located rearwardly of the frame 3 is secured to the frame bar 3a.

The bearings 4 and 5 extend inwardly from the frame bars 3b and 3c. The spindles 6 extend across the openings 4a and 5a of the bearings, and extend outwardly beyond the frame bars 3b and 3c. The traction wheels 1 and 2 are rotatably mounted on the outer portions of the spindles 6 in spaced relation to the outer sides of the frame bars 3b and 3c, and spur gears 11 and 12 are rotatably mounted on said spindle portions between the frame bars 3b and 3c and the traction wheels. Each of the gears 11 and 12 is, as shown in Figure 4, provided with a sleeve like hub 13 which is rotatably supported on the spindle 6 by bearings 14 and which is secured on the spindle by a nut 15. The traction wheels 1 and 2 are rotatably mounted on the hubs 13, and are connected to the gears 11 and 12 by ratchets, one of which is shown in Fig. 10 and designated generally 16. The traction wheels 1 and 2 are mounted for independent rotation, and are connected with the gears 11 and 12 only during forward rotation, so that they may rotate differentially while the machine is being turned. Each of the ratchets 16 comprises an annular series of teeth 17 formed in the hub of each of the traction wheels 1 and 2, and pawls 18 carried by each of the gear hubs 13 and urged in the direction of the teeth by springs 19. The gear 12 from which motion is transmitted to the cutter bar 20 is driven by the traction wheel 1 as well as by the traction wheel 2, and this is accomplished by the gear 11 and gears 21 and 22, the gears 21 and 22 meshing with the gears 11 and 12, respectively, and being fixed to a shaft 23 journalled in the top frame bar 3a.

The over-all width of the machine is less than the distance between rows of corn spaced apart sufficiently to permit soy beans or the like to be planted between them. The frame 3 is high enough to pass over the crop being cut. The cutter bar 20 is shorter than the distance between the traction wheels 1 and 2, and is arranged horizontally between the wheels in right angular relation to the longitudinal center of the machine. The cutter bar 20 is also arranged symmetrically with relation to the center of the machine; that is to say, equal portions of the cutter bar are arranged at opposite sides of the center of the machine.

The cutter bar 20 which may be of any well-known or appropriate construction, is shown for the purpose of illustration as comprising a shoe 24, finger bar 25, knife bar 26, guard fingers 27, and knife sections 28. The cutter bar 20 is suspended from the frame 3 by a tubular coupling bar 29 which extends longitudinally of the machine in close parallel relation to the gear 12, and which is pivotally connected near its rear end to the lower end of the frame bar 3c by means of the spindle 6 on which the gear 12 and the traction wheel 2 are mounted. This connection is established by a lug 30 formed on the coupling bar 29 and pivotally mounted on that portion of the spindle passing through the bearing recess 5a. The lug 30 contacts with the end walls of the recess 5a to hold the coupling bar 29 against lateral movement.

The coupling bar 29 is provided at its rear end with a gear housing 31 and at its front end with a gear housing 32. A portion of the housing 32 extends downwardly and outwardly from the front end of the coupling bar 29, and a bracket arm 33 extends downwardly and inwardly from the upper portion of the housing. A disc 34, having a wrist pin 35, is located at the front side of the lower portion of the housing 32, and is fixed to a shaft 36 journalled in and extending centrally through this housing portion. The bracket arm 33 is secured, as at 33a, to the upper portion of the housing 32.

A knuckle 37 is connected by a bolt 38 to the inner lower end of the bracket arm 33, and is connected by bolts 39 to lugs 40 extending upwardly from the cutter bar shoe 24. The bolt 38 connects the cutter bar 20 to the coupling bar 29 for pivotal movement about an axis extending transversely of the machine, to the end that the angle of approach of the cutter bar to the crop may be varied. The bolts 39 connect the cutter bar to the coupling bar 29 for pivotal movement about an axis extending longitudinally of the machine, to the end that the cutter bar 20 may adjust itself to compensate for any slope in the ground, and to the end that the cutter bar may be folded or raised into a vertical position. The coupling bar 29 is rockable about its pivot 6, to the end that the cutting distance of the cutter bar 20 from the ground may be varied manually, and to the end that the cutter bar may move upwardly from and return to its adjusted position during and after the passage of the shoe 24 over an obstruction.

A lever 41 is pivotally mounted as at 42, on the inner side of the frame bar 3c at a point above the pivotal connection 6 of the coupling bar 29 with this frame bar. The lever 41 extends upwardly from its pivot 42 rearwardly of the frame bar 3a so that it may be swung rearwardly with relation to the frame 3. The lever 41 is provided at its lower end with a forwardly directed short arm 41a. A link 43 extending from the lever arm 41a to the coupling bar 29, has a pin and slot connection 43a with the lever arm, and is connected by a pivot 43b to the coupling bar forwardly beyond the pivot 6 of the coupling bar. The lever 41 and link 43 provide means by which the coupling bar 29 may be rocked about its pivot 6 to arrange the cutter bar 20 at the required distance from the ground. A notched sector 44 secured to the frame bar 3c, and a latch 45 carried by the lever 41 and engaging the sector, provide means by which the coupling bar 29 and cutter bar 20 may be secured against accidental downward movement from adjusted position. In the lowest cutting position of the cutter bar 20, the shoes 24 and 81 contact with the ground. The cutter bar 20 may be raised from this position to any point within ten inches from the ground, whereby to adapt the machine for cutting low and tall growing crops. The link 43, due to its pin and slot connection 43a with the lever arm 41a, has a limited upward movement with relation to the lever arm, to the end that the coupling bar 29 may rock about its axis 6 when either of the shoes 24 and 81 encounters an obstruction. The coupling bar 29 has slight angular relation to the ground so as to offer the minimum resistance to its upward movement.

The knife bar 26 of the cutter bar 20 is driven from the disc 34 by a pitman 48 connected to the wrist pin 35 on the disc and to a ball stud 49 on that end of the knife bar nearest the shoe 24. The bracket arm 33, suspending the cutter bar 20 from the front end of the coupling bar 29, is offset inwardly from the coupling bar, and the disc 34 is offset downwardly and outwardly from the coupling bar, whereby to arrange the cutter bar 20 with equal portions thereof at opposite sides of the longitudinal center of the machine, and whereby to arrange the wrist pin 35 and the ball stud 49 far enough apart to enable the pitman 48 to be of such length as will establish an efficient driving connection between the wrist pin and the ball stud.

The coupling bar 29 is, as shown in Fig. 4, terminally provided with bearings 50 and 50a, and journalled in the bearings is a shaft 51 provided at its front end with a spur gear 52 and at its rear end with a bevel pinion 53. The gear 52 is located in the housing 32, and meshes with a similar gear 54 fixed to the shaft 36 within the housing. A shaft 55 located rearwardly of and at right angles to the shaft 51, is journalled in bearings 56 carried by the housing 31. A spur pinion 57 loose on the shaft 55 passes through the housing 31 and engages the gear 12. A bevel gear 58 fixed to the shaft 55, as at 58a, and connected by a ratchet clutch to the pinion 57, engages the pinion 53. The traction wheels 1 and 2, gears 11, 12, 21 and 22, pinion 57, gears 58 and 53, shaft 51, gears 52 and 54 and pitman 48 constitute the operating mechanism for the knife bar 26.

A ratchet clutch connecting the pinion 57 and gear 58, comprises, as shown in Figures 4 to 8, a collar 59 slidable on the hub 60 of the gear 58, pins 61 fixed to the collar and extending through openings 62 in the web of the gear 58, and shoulders 63 and cam faces 66 formed on the pinion 57. The pinion 57 is driven rearwardly during the forward motion of the machine. The shoulders 63, which face in the direction of rotation of the gear 57, engage the pins 61 during the forward motion of the machine. The pins 61 are yieldingly held by a spring 64 in position to be engaged by the shoulders 63, said spring being sleeved on the gear hub 60 between the collar 59 and a shoulder 65 on the hub. The cam faces 66, which are located forwardly of the shoulders 63, move the clutch pins 61 automatically out of the path of the shoulders on the forward rotation of the pinion 57, which will occur in the majority of turnings and during the backing of the machine should the ratchets 16 fail to free the gears 11 and 12 from the traction wheels 1 and 2, and which will also occur when the pinion is being moved upwardly with relation to the gear 12 by the rocking of the coupling bar 29 during the downward movement or adjustment of the cutter bar 20. The movement of the pins 61 out of the path of the shoulders 63 frees the cutter bar operating mechanism from driving connecting with the traction wheels 1 and 2, with the result that the machine will roll easy in backing and in the majority of turnings, should the clutches 16 fail to function, and with the result that the coupling bar 29 and the cutter bar 20 will return promptly to their normal adjusted position after the elevation thereof as the result of the shoe 24 passing over an obstruction. This also insures the prompt downward movement of the cutter bar when the cutter bar is being lowered from one cutting position to another.

It will be apparent that the clutch connects the cutter bar operating mechanism to the traction wheels while the machine is in forward motion, and automatically disconnects the cutter bar from the traction wheels while the machine is being backed and turned and while the cutter bar is being lowered, or is returning from a raised to a lowered position with relation to the ground.

To the end that the pinion 57 may be manually disconnected from the gear 58, and thus permit the easy upward adjustment of the coupling bar 29 and cutter bar 20 through the medium of the lever 41, means are provided by which the operator may conveniently withdraw the pins 61 from engagement with the shoulders 63. This means comprises, as best shown in Figures 3, 4 and 13, a fork 67 located within the housing 31 and engaging an annular groove 68 in the periphery of the collar 59. The fork 67 is fixed to a shaft 69 arranged parallel to the axis of the collar 59 and passing through and slidably supported by the inner side wall 31a of the housing 31.

A lever 70 rockably mounted on and extending for unequal distances in opposite directions beyond the shaft 69, is movable over a cam 71 to effect the withdrawal of the pins 61 from engagement with the shoulders 63. The cam 71 is secured to the inner side wall 31a of the housing 31 in position to be engaged by the short arm 70a of the lever 70 when the latter is rocked forwardly. The cam 71 has a front face 71a inclined with relation to the axis of the collar 59, a side face 71b right angularly related to said axis, and a shoulder 71c rearwardly of the face 71b. The lever 70 is adapted to be rocked forwardly to effect the withdrawal of the pins 61 from engagement with the shoulders 63 by means of a lever 72 mounted between its ends on a pivot 73 carried by a bracket 74 secured to the frame bar 3a. The lever 72 is located rearwardly of the frame bar 3a, and the lower end thereof is connected by a rod 75 to the long arm 70b of the lever 70.

The lever 72 is located within convenient reach of the driver's seat 10, and when pulled rearwardly moves the lever 70 across the cam 71. During the movement of the lever 70 over the cam face 71a, the pins 61 are withdrawn from engagement with the shoulders 63, with the result that the knife bar operating mechanism is rendered inoperative. During the movement of the lever 70 over the cam face 71b, the pins 61 are held out of engagement with the shoulders 63, and on the movement of the lever into engagement with the shoulders 71c, the pins are latched out of engagement with the shoulders. The lever 70 may be held in contact with the cam face 71b if it is desired to maintain the pinion 57 disengaged from the shaft 55 only during such times as the coupling bar 29 and cutter bar 20 are being raised or lowered through the medium of the lever 41 to vary the cutting position of the cutter bar with relation to the ground. When it is desired to maintain the pinion 57 disengaged from the shaft 55 for a comparatively long period, as for instance when driving to or from the field, the lever 70 is moved into engagement with the shoulder 71c. The pins 61 are withdrawn from engagement with the shoulders 63 against the tension of the spring 64 which returns the pins into engagement with the shoulders when the lever 70 is moved out of contact with the cam 71.

The cutter bar 20 is adjustable about its axis 38, to vary its angle of approach to the crop, by means comprising, as best shown in Fig. 3, a lever 76 pivoted at its lower end to the inner side wall 31a of the housing 31, an arm 77 extending upwardly from the rear side of the knuckle 37, and a rod 78 connecting the lever and arm. The lever 76 is also located within convenient reach of the driver's seat 10, and is held against accidental movement, so as to support the cutter bar 20 in its adjusted position, by a latch 79 carried by the lever and engaging a notched sector 80 fixed to the housing 31.

A shoe 81 secured to the lower end of the housing 32, and having an upwardly and forwardly directed front end positoned in front of the disc 34 and pitman 48, serves as a guard for the disc and pitman.

From the foregoing description, taken in connection with the accompanying drawings, it will be apparent that the mowing machine is of such width that it may be drawn between two adjacent rows of corn to harvest the soy beans or other crop between the rows. The horizontal arrangement of the short cutter bar 20 between the vertical planes in which the traction wheels are located, and the arrangement of the cutter bar with equal portions thereof at opposite sides of the longitudinal center of the machine, adapt the cutter bar to function most efficiently. The coupling bar 29 carries the means for transmitting motion from the traction wheels to the knife bar 26 of the cutter bar. Due thereto, and as the coupling bar carries the cutter bar 20, the relation of the wrist pin 35 with respect to the ball stud 49 on the cutter bar 26 remains the same in all adjusted positions of the cutter bar with relation to the coupling bar. This, together with the mounting of the coupling bar 29 for rocking movement about an axis coincident with the axis of rotation of the traction wheels 1 and 2, insures smooth and positive operation of the knife bar 26 in all adjusted positions of the cutter bar with relation to the coupling bar. The arrangement of the cutter bar 26 inwardly of the coupling bar 29, and the arrangement of the wrist pin 35 outwardly of and downwardly from the coupling bar, adapt the cutter bar to be symmetrically arranged without resorting to a short pitman, the comparatively long pitman used establishing a highly efficient driving connection between the wrist pin and knife bar. The cutter bar 20 may be readily adjusted to vary its distance from the ground, and latched against any accidental downward movement from adjusted position, through the medium of the lever 41 and latch 45. The coupling bar 29 has the adjusting mechanism connected thereto and is rocked about its axis 6 to effect this adjustment of the cutter bar 20. The cutter bar 20 and the coupling bar 29 may move upwardly from adjusted position when the cutter bar shoe 24 encounters a stone or the like, and due thereto, liability of damage to the cutter bar is reduced to the minimum. The upward movement of the cutter bar 20 and coupling bar 29 is rendered easy owing to the small angular arrangement of the coupling bar with relation to the ground. The downward movement of the cutter and coupling bars is rendered easy owing to the fact that the pinion 57 is disconnected from the gear 58 during this movement of these bars. The ratchet clutch is operable manually by the lever 72 and associated parts to disconnect the knife bar operating means from the traction wheels, and thus permit the cutter bar to be readily raised manually to vary its distance from the ground. The angle of approach of the cutter bar 20 to the crop may be varied through the medium of the lever 76 and associated parts.

Owing to the arrangement of its cutter bar in front of its wheel supported frame, the machine, as thus far described, may be termed a front cutting mower. Provision is made to arrange a cutter bar extending laterally from the right side of the frame, so as to adapt the machine to be converted into a side cutting mower, and thus enable it to be used for cutting grain, for cleaning and mowing ditch banks, small terraces and the like, and for cleaning out fence corners and the like.

When the machine is to be converted into a side grain cutting mower, the short cutter bar 20 is detached from the bracket arm 33, the pitman 48 is detached from the wrist pin 35 and the rod 78 is detached from the lever 76. A long cutter bar 20a is then secured to the frame 3 in position to extend laterally from the right hand side thereof. This cutter bar 20a, which differs from the cutter bar 20 merely as to length, is connected to the frame 3 by the coupling bar 29 and a coupling frame 82. The coupling frame 82 comprises, as best shown in Figures 11 and 12, a bar 82a extending longitudinally of the frame. The coupling bar 82a has one end detachably and loosely secured in a boss 83 formed on the front side of the coupling bar lug 30. The coupling bar 82a extends downwardly and forwardly from the boss 83, and the coupling bar 82b extends upwardly and rearwardly from the lower end of the coupling bar 82a. The coupling bar 82b is detachably secured between its ends, by bolts 84, to a bracket lug 85 rockable on the spindle 6 of the traction wheel 1. The bracket lug 85 is located in the recess 4a of the bearing 4, and it contacts with the sides of the recess to cooperate with the lug 30 in holding the coupling bars against lateral play with relation to the frame 3. A shaft 86 carried by the coupling bars 82a and 82b extends laterally from the point of juncture of these bars, and is horizontally arranged in front of the traction wheel 1.

A sleeve 87 is mounted on the shaft 86 for rotary and axial movements with relation thereto. A knuckle 88 formed integrally with the sleeve 87 is connected by bolts 89 to the shoe 24a of the cutter bar 20a. The sleeve 87, as it is rotatable on the shaft 86, connects the cutter bar 24a to the coupling bars 29, 82a and 82b for adjustment with relation to the bars about an axis extending transversely of the machine, to the end that the angle of approach of the cutter bar to the crop may be varied. The bolts 89 connect the cutter bar 20a to the sleeve for pivotal movement with relation to the coupling bars 29, 82a and 82b about an axis extending longitudinally of the machine, to the end that the cutter bar may adjust itself to compensate for any slope in the ground, to the end that the cutter bar may be adjusted manually into any upwardly or downwardly inclined position necessary to adapt it to be used on ditch banks or terraces, and to the end that the cutter bar may be folded or swung into a vertical position. The coupling bars 29, 82a and 82b are rockable as a unit about the axes 6, to the end that the distance of the cutter bar 20a from the ground may be varied manually, and to the end that the cutter bar may move upwardly from and return to its normal position during and after the passage of the shoe 24a, over an obstruction.

A brace rod 90 yieldingly connected to a ball stud 91 on the bracket arm 33, and similarly connected to a ball stud 92 on the knuckle 88, offsets the thrust of a pitman 93 connecting the knife bar 26a of the cutter bar 20a to the wrist pin 34, with the result that the front ends of the coupling bars are held against inward and outward movement relatively. The springs in the ends of the brace rod maintain a tight joint between the rod and ball studs.

A lever 94 similar to the lever 76 is pivoted between its ends, as at 95, to the rear end of the coupling bar 82b, and is connected at its lower end by a rod 96 to an arm 97 extending upwardly from the knuckle 88. The lever 94, which is best shown in Fig. 12, provides means by which the cutter bar 20a may be rocked about its axis 86 to vary its angle of approach to the crop. A latch 98, carried by the lever 94, and engaging a notched sector 99, fixed to the rear end of the hanger arm 82b, serves to hold the cutter bar 20a in its adjusted position.

A lever 100 is, as shown in Fig. 12, fixed to a shaft 101, and a link 102 is connected to the coupling bar 82b and to an arm 103 on the shaft. A latch 104 carried by the lever 100 engages a notched sector 105 fixed to the frame bar 3a. The shaft 101 is located forwardly of, above and parallel to the frame bar 3a, and is mounted in bearings 106 fixed to this frame bar. The lever 100 extends upwardly from the shaft 101 to the right of the seat 10. The arm 103 extends downwardly from the shaft 101, and the link 102, which is pivotally connected, as at 107, to the coupling bar 82b, is connected to the arm by a pin 108 carried by the arm and engaging in a slot 109 in the link.

A lever 113 is pivotally mounted between its ends, as at 114, upon the inner side of the frame bar 3b between the pivots 6 and 101. This lever has a long arm 113a extending upwardly from the pivot 114 rearwardly of the frame bar 3a, and a short arm 113b extending forwardly from the pivot 114. An arm 125, best shown in Fig. 11, extending upwardly from the shaft 101, and a link 126, connected to the arm and lever 113, couples the levers 100 and 113 for simultaneous movement when the lever 100 is swung rearwardly. A link 115 connects the lever arm 113b to the long arm of a lever 116 which is pivoted, as at 117, to the upper end of a support 118 rising from the sleeve 87, as shown in Fig. 14. The lever 116 extends in the direction of the length of the sleeve 87, and the link 115 is connected to the inner end thereof. Means 119 connecting the lever 116 to the shoe 24a of the cutter bar 20a, comprises a link 119a pivoted, as at 120, to the cutter bar shoe 24a, at a point outwardly of and slightly above the pivotal connection 89 of the shoe with the sleeve 87. This outer link 119a extends upwardly and then inwardly from its pivot 120, and is connected at its inner end, as at 121, to an intermediate link 119b, and the link 119b is connected at its inner end, as at 122, to the outer end of an inner link 119c. The link 119c is pivotally connected at its inner end, as at 123, to lever 116 at a point below and slightly inward of the pivotal connection of the lever with its support 118. The link 119b is in the form of a turn buckle to permit the effective length of the link 119 to be varied, and thus enable the cutter bar to be adjusted about its axis 89 to arrange it in a horizontal position when necessary to compensate for varying weights of cutter bars. The lever 116 is provided outwardly of its pivot 117 and the link pivot 123 with a flange 116a which occupies a position above the link 119c.

The lever 100, link 102, lever 113, link 115, connecting member 119, and link 126 constitute means through the medium of which the coupling bars 29, 82a and 82b may be rocked about their pivots 6 to arrange the cutter bar 20a at the required distance from the ground. In the lowest cutting position of the cutter bar 20a, the shoes 24a and 81 contact with the ground. The cutter bar 20a may be raised from this position to any point within ten inches from the ground, whereby to adapt the machine for cutting low and tall growing crops. The lever 41 may be, and preferably is, used together with the lever 100, to vary the cutting position of the cutter bar 20a with relation to the ground, and after the adjustment has been effected the latches 45 and 104 are engaged with their respective sectors to support the cutter bar in adjusted position. The loose connection between the link 43 and lever 41, the loose connection between the link 102 and arm 103, and the loose connection between the lever 113 and link 126, permit the coupling bars 29, 82a and 82b and the cutter bar 20a to rock upwardly when either of the shoes 24a and 81 encounters an obstruction.

The loose connection between the lever 113 and the link 126, which is established by a pin 127 carried by the lever and working in a slot 128 in the link, permits this lever to be swung rearwardly independently of the lever 100, to lift the cutter bar 24a to clear an obstruction, the cutter bar 24a when lifted rocking on its pivots 89 with relation to the coupling bars 29, 82a and 82b.

The lever 100, link 102, lever 113, link 115, connecting member 119 and link 126, also constitute means through the medium of which the cutter bar 20a may be folded, that is to say, moved into vertical position on the coupling bars 29, 82a and 82b.

When the lever 100 is rocked rearwardly, a similar movement is imparted to the lever 113 through the arm 125 and the link 126. During the initial phase of the movement of the levers, the upper end of the link 102 is swung forwardly by the pin 108, and an upward pull is exerted on the inner end of the lever 116 through the action of the link 126, lever 113 and link 115. This pull is counter-acted by the weight of the cutter bar 20a. Due thereto, and since it requires more power to rock the cutter bar upwardly on its pivot 89 than to rock the coupling bars and cutter bar upwardly on the pivots 6, the coupling bars will move upwardly with the cutter bar 20a extending horizontally therefrom. During the upward movement of the coupling bars 29, 82a and 82b, the link 102 moves upwardly with relation to the arm 103 until the bottom wall of its slot 109 contacts with the pin 108 on the arm 125. When this contact takes place, the coupling bars 29, 82a and 82b are held against further upward movement with relation to the arm 103, the cutter bar 20a is in its highest cutting position, and the pin 108 is forward beyond the pivot 101. During the remaining phase of the movement of the lever 100 the cutter bar 20a will swing upwardly into vertical position on its pivot 89, due to the holding of the coupling bars 29, 82a and 82b against further upward movement with relation to the arm 103 by the link 102, and due to the downward swinging movement imparted to the links 119a—119c by the lever 116. While the cutter bar 20a is swinging into vertical position, the coupling bars 29, 82a and 82b are moving upwardly and exert upward thrust on the arm 103 through the link 102 and pin 108. This upward thrust of the link 102 against the arm 103 acts to swing the levers 41 and 100 rearwardly after the arm 103 has passed forwardly beyond the pivot 101. This enables the cutter bar to be folded with the minimum of effort and with a short lever. The upward thrust is present, due to the fact that it is necessary to overcome the difference in the power required to lift the coupling bars and cutter bar vertically and that required to fold the cutter bar to a vertical position.

The use of the lever 41 with the lever 100 to fold the cutter bar, to raise or lower the cutter bar from one cutting position to another, and to support the cutter bar in cutting position, prevents any relative vertical movements of the front ends of the coupling bars, whereby to insure the maintaining of the wrist pin in its proper position with relation to the ball stud 92 of the knife bar 26a. When operating lever 113 to lift the cutter bar 20a, the locked lever 100 and link 102 hold the coupling frame against upward movement, thus causing pull on lever 116 to lift the cutter bar.

As shown in Fig. 11, an arm 110 extends upwardly from the shaft 101, and is provided at its upper end with a roller 111 for contact with a cam 112 on the front side of the lever 72, when the arm is swung rearwardly as the result of the rearward swinging movement of the levers 41 and 100 to either fold the cutter bar 20a or raise it from one cutting position to another. The rearward movement of the arm 110 takes place during the initial phase of the operation of the levers 41 and 100, and, by reason of the contact of the arm with the cam 112, rocks the lever 72 rearwardly. This movement of the lever 72 effects the disconnection of the gear 58 from the pinion 57, and thereby permits the cutter bar 20a to be folded or raised from one cutting position to the other, with the cutter bar operating mechanism disconnected from the driving wheel gears 11, 12, 21 and 22. A contractile spring 124 secured to the frame bar 3b below the pivot of the lever 113, and secured to the lever above the pivot, assists the operator in raising the cutter bar 20a to clear an obstruction. The shoes 24a and 81 ride on the ground when low growing crops are being mowed. The spring 124 since it constantly tends to raise the coupling bars 29, 82a and 82b reduces to the minimum the friction between the shoe and the ground.

It will be apparent that the side cutting mowing machine, like the front cutting type, employs the coupling bar 29 and the knife bar operating mechanism carried thereby, and also employs the lever 72 and associated parts for rendering this mechanism inoperative during the bodily upward adjustment of the cutter bar 20a. The side cutting mowing machine also employs the lever 41 and its associated parts as part of the means for controlling the cutting position of the cutter bar 20a with relation to the ground, and for folding the cutter bar, this means also including the levers 100 and 113 and associated parts. The use of this lever with the lever 100 to vary the cutting position of the cutter bar 20a, and to support the cutter bar in adjusted position, prevents any vertical displacement of the wrist pin 35 with relation to the ball stud 92, and also insures the cutter bar being maintained in a horizontal cutting position by avoiding any twisting of the coupling frame made up of the bars 29, 82a and 82b. This insures such relation of the cutter bar 20a and wrist pin 35 that the pitman will act freely, and there will be no loss of power due to the pitman binding or working at too great an angle. As it is not in the way, the lever 76, in place of which the lever 94 is used to regulate the angle of approach of the cutter bar 20a, is not removed, it being merely secured against accidental movement by its latch 79. To convert the side cutting mower into a front cutting mower, it is only necessary to disconnect the coupling bars 82a and 82b from the brackets 30 and 85, disconnect the brace rod 90 from the bracket arm 33 and the pitman 93 from the wrist pin 35, disconnect the links 102 and 115 from the arms 103 and 113b, secure the levers 100 and 113 against accidental movement by the latch 104 of the lever 100, and connect the cutter bar 20 to the bracket arm 33, the pitman 48 to the wrist pin 35, and the rod 78 to the lever 76.

The cutter bar 20, pitman 48 and rod 78 constitute one cutting unit. The cutter bar 20a, coupling bars 82a and 82b, pitman 93, brace rod 90 and links 102 and 115 constitute another cutting unit. Either of these units may be easily and quickly applied to the wheel supported frame for operation and control by the mechanism and levers carried by the frame.

When the machine is to be used for cleaning and mowing ditch banks, small terraces and the like, and for cleaning out fence corners and the like, preferably a short cutter bar 20b is used in place of the long cutter bar 20a, as shown in Fig. 15.

Figure 17:
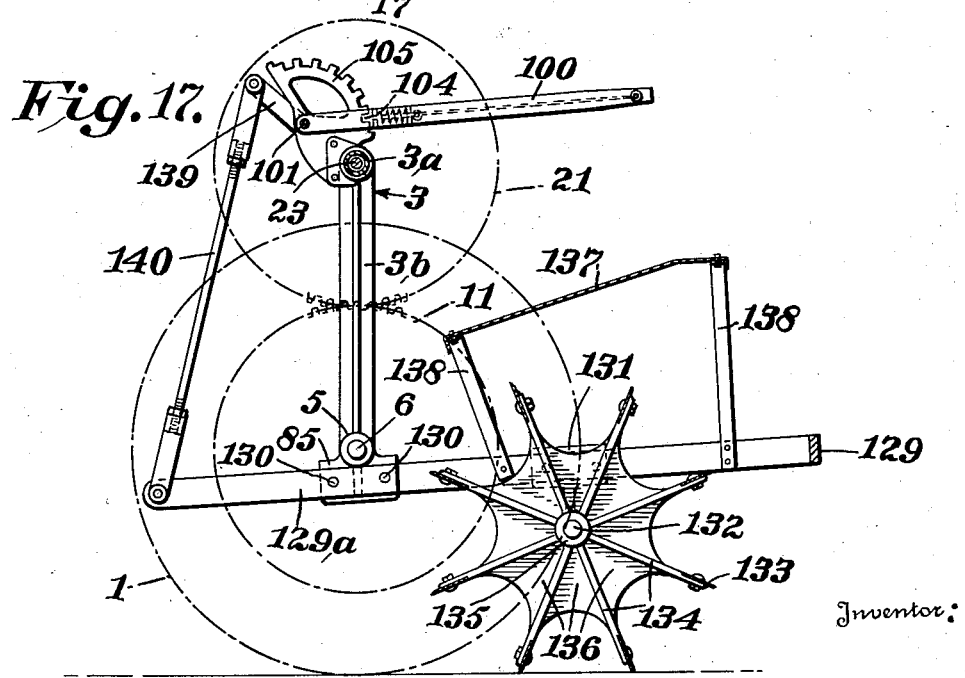
Fig. 17 is a sectional view taken on the line 17—17 of Fig. 16.

The machine may be converted from a front cutting or a side cutting mower into a stalk cutter by removing the cutting unit applied to the frame, together with all of the levers with the exception of the levers 100, and by substituting therefor the cutting unit shown in Figs. 16 and 17. This stalk cutting unit comprises a frame 129 which has its side bars 129a pivoted between their ends to the wheel spindles 6 by the bearing bracket 85 and a similar bracket 85a. One of the frame bars 129a is detachably secured by bolts 130 to the bearing bracket 85, and the bracket 85a may be permanently secured to the other frame bar. The frame 129 extends forwardly and rearwardly beyond the main frame 3, and it is provided rearwardly of the main frame with bearings 131 in which a shaft 132 is journalled. An annular series of blades 133 are carried by spokes 134 carried by hubs 135 on the shaft 132. The spokes 134 are reinforced by webs 136, located between them. The stalk cutter is located below the seat 10. To protect the driver from cut portions of stalks flying from the stalk cutter, a shield 137 is located above the cutter. The shield 137 is supported from the frame 129 by bars 138. The shaft 101 is provided with forwardly directed arms 139 which are connected to the front ends of the side bars 129a by rods 140 so as to adapt the lever 100 to be used for the purpose of raising the stalk cutter out of and lowering it into operative position, and for the purpose of regulating the pressure under which the blades 133 engage the stalks. The further the stalk cutter is moved downwardly with relation to the frame, the greater the cutting pressure or power of the blades 133. As the cutting pressure or power of the blades 133 may be varied, the machine may be adjusted for cutting stalks of different degrees of toughness. The stalk cutter is held in adjusted position by the latch 104 and the sector 105 of the lever 100. By disconnecting the frame 129 from the bearing bracket 85, by disconnecting the bracket 85a from the spindle 6 of the traction wheel 2, and by disconnecting the rods 140 from the arms 139, the stalk cutting unit may be removed to adapt the machine to be converted into a front cutting or a side cutting mower, as hereinbefore described.

I claim:

1. A mowing machine for harvesting a crop planted between rows of corn, the machine having an over-all width adapting it to move between two adjacent rows of corn, the machine including a wheel supported frame, a cutter bar and cooperating knife bar shorter than the width of the frame and cutting a path less than the distance between the wheels, means supporting the cutter bar from the frame in horizontal position between the wheels and with equal portions thereof located at opposite sides of the longitudinal center of the machine, and means disposed within the wheel tracks for operating the knife bar.

2. A mowing machine according to claim 1 in which the frame is of arched formation transversely of the machine and of such height as to pass over the crop being harvested.

3. A mowing machine according to claim 1 in which the cutter bar supporting means is connected to the frame for movement to adjust the cutter bar upwardly or downwardly, and means for moving said first means to effect adjustment of the cutter bar, said last means securing the said first means against accidental downward movement and including a link bar having a pin and slot lost motion connection permitting the cutter bar to move upwardly with relation thereto.

4. A mowing machine according to claim 1 in which said operating means includes a line shaft extending through said supporting means, the knife bar operating means including a disc carried by said supporting means and having a wrist pin connected to the cutter bar by a pitman, the cutter bar being connected at one end to the means for supporting it from the frame, and the disc being disposed laterally of said supporting means on the side opposite from the cutter bar to provide for the use of a pitman of efficient length.

5. A mowing machine according to claim 1 in which a gear is driven by the wheels, in which the cutter bar supporting means is connected to the frame for movement to adjust the cutter bar upwardly or downwardly, and means for transmitting motion from the gear to the knife bar and carried by the cutter bar supporting means to maintain a definite relation of the parts of said motion transmitting means in all adjustments of the cutter bar, the cutter bar supporting means being movable about a pivot coincident with the axis of the wheels, and said gear being positioned on the opposite side of the pivot for the supporting means from the cutter bar to tend to counterbalance the cutter unit.

6. A mowing machine comprising a wheel supported frame, a cutter bar including a knife bar, means coupling the cutter bar to the frame and rockable about a pivot coincident with the axis of the wheels to adjust the cutter bar upwardly or downwardly, a gear rotatable about said axis and driven from the wheels, a shaft carried by said means and having a driving connection with the knife bar, a pair of gears carried by said means, one gear of said pair engaging said first gear, a gear on the shaft engaging the other gear of said pair, a clutch normally connecting the gears of said pair and adapted to free the gears from each other when the cutter bar supporting means is rocked in one direction, and means for rocking said first means.

7. A mowing machine adapted to harvest a crop planted between rows of corn and having an overall width to adapt it to move between two adjacent rows of corn, the machine including a wheel supported frame, a cutter bar shorter than the width of the frame and including a knife bar, a hanger bar extending longitudinally of the machine, a bracket arm extending downwardly and inwardly from the front end of the hanger bar and having one end of the cutter bar secured thereto, a member extending downwardly and outwardly from the front end of the hanger bar, a disc having a wrist pin and journalled on the lower portion of said member, a pitman connected to the knife bar and wrist pin, and means for rotating said disc.

8. A mowing machine including a wheel supported frame, means by which a cutter bar may be supported from the frame at the front of and centrally of the machine, separate means by which a cutter bar may be supported from the frame at one side of the machine, and a common wheel driven means for operating a knife bar supported by one of said means and lying in either position relative to the machine.

9. A mowing machine including a wheel supported frame, hanger bars extending in spaced relation longitudinally of the frame and pivoted thereto, a cutter bar including a knife bar connected at its inner end to one of the hanger bars and projecting laterally beyond the machine, wheel driven means carried by the other hanger bar for operating the knife bar, and a brace rod extending from said other hanger bar across the machine to the cutter bar.

10. A mowing machine according to claim 9 having a link bar for moving the hanger bars to effect the adjustment of the cutter bar, said link bar having a lost motion connection holding the hanger bars against accidental downward movement from adjusted position while permitting upward movement of said bars.

11. A mowing machine according to claim 1 in which the cutter bar is mounted for independent adjustment about an axis extending longitudinally and about an axis extending transversely of the machine.

12. A mowing machine comprising an arched frame, spindles carried by and extending laterally from the side bars of the frame, sleeves journalled on the outer portions of the spindles, traction wheels journalled on the spindles for independent rotation, gears fixed to the spindles between said side bars and wheels, ratchets connecting the wheels to the gears, a shaft journalled on the frame and having fixed thereto gears engaging said first gears, a cutter bar having a knife bar and mounted on the frame, and means for transmitting motion from one of said first gears to the knife bar.

13. A mowing machine comprising an arched frame, spindles carried by and extending laterally from the side bars of the frame, sleeves journalled on the outer portions of the spindles, traction wheels journalled on the spindles for independent rotation, gears fixed to the spindles between said side bars and wheels, ratchets connecting the wheels to the gears, a shaft journalled on the frame and having fixed thereto gears engaging said first gears, a cutter bar including a knife bar, a hanger bar pivoted to the frame and having the cutter bar connected thereto, a shaft journalled on the hanger bar and connected to the knife bar, a gear carried by the shaft, a second shaft journalled on the hanger bar, a pair of gears mounted on said second shaft, one gear of said pair engaging the gear on said first shaft and the other engaging one of said first gears, and a clutch connecting the gears of said pair to establish a driving connection between them when one of them is rotating in one direction.

14. A mowing machine comprising a frame, traction wheels journalled on the frame for independent rotation, a wheel driven gear mounted for rotation about an axis coincident with the axis of the wheels, a tubular hanger bar extending longitudinally of the machine and mounted on the frame for pivotal movement about an axis coincident with said first axes, a shaft journalled in the hanger bar, a gear on the front end of the shaft, a housing extending downwardly and outwardly from the front end of the hanger bar and inclosing said second gear, a shaft journalled in the lower portion of the housing, a gear on said last shaft and engaging said second gear, a disc on said last shaft outwardly of the housing and provided with a wrist pin, a cutter bar including a knife bar, means connecting the cutter bar to the front end of the tube, a pitman connected to the wrist pin and knife bar, a housing on the rear end of the tube, a shaft journalled in this housing at right angles to said first shaft, a gear loose on said right angular shaft and engaging said first gear, a gear fixed to said right angular shaft and engaging a gear on the rear end of said first shaft, a clutch establishing a driving connection between the gears on said right angular shaft when said first gear is turned in one direction, and means for rocking the hanger bar on its pivot to effect an adjustment of the cutter bar.

15. A mowing machine having carrying wheels, an arched shape frame between said wheels, adapted to pass over a row of a crop between said wheels, a supporting bracket at each side of the machine, means for supporting a cutter mechanism from either of said brackets, means carrying a wrist pin arranged offset laterally outward relative to one of the brackets for driving a pitman for operating the cutter mechanism when supported from either bracket, substantially as described.

16. Apparatus according to claim 15 in which the brackets are connected by a bar.

17. Apparatus according to claim 15 in which both brackets are adjustable up and down, and means on the frame for effecting said adjustment.

18. Apparatus according to claim 15 in which each bracket is connected to a member individual thereto, extending lengthwise of the machine and pivotally mounted in rear of its front end and means for raising and lowering said members with the brackets, substantially as described.

19. A mowing machine according to claim 15 in which each bracket is carried by a member individual thereto extending rearwardly at each side of the arched frame and pivotally mounted coaxially with the carrying wheels.

20. A mowing machine comprising a frame, a carrying wheel at each side thereof, a shaft extending lengthwise of the machine at one side thereof, differential driving means for said shaft including a pair of gears each member of which is driven from an adjacent carrying wheel, pitman operating member offset downwardly and laterally outward from the front end of said lengthwise extending shaft, a pitman actuated by said operating member, and gearing between the front end of the said lengthwise shaft and the offset pitman operating means, substantially as described.

21. In a mowing machine according to claim 6, a cam carried by the cutter bar supporting means, a member connected to the clutch and movable over the cam to effect the retraction of the clutch, and a lever pivoted on the frame and connected to said member for moving it over the cam.

22. A mowing machine comprising a wheel supported frame, hanger bars extending in spaced relation longitudinally of the frame and pivoted between their ends thereto, cutter mechanism connected to the front end of one of the hanger bars and extending laterally beyond the machine, wheel driven means carried by one of the hanger bars for operating the cutter mechanism, and a bar extending from the front end of the hanger bar having the cutter mechanism connected thereto inwardly across the machine to the other hanger bar near its pivotal connection with the frame.

23. A mowing machine comprising a wheel supported frame, a hanger bar pivoted to and extending longitudinally of the frame, a shaft extending from the front end of the hanger bar transversely of the frame, a second hanger bar pivoted to and extending longitudinally of the frame, the hanger bars being located at opposite sides of the longitudinal center of the machine, a bar connected to the front end of said first hanger bar and to said second hanger bar near the pivotal connection thereof with the frame, a sleeve rotatably and slidably mounted on the shaft, a yielding connection between the sleeve and the front end of said second hanger bar, a wrist pin mounted on the front end of the said second hanger bar, wheel operated means carried by said second hanger bar for rotating the wrist pin, a cutter bar carried by the sleeve and including a knife bar, and a pitman connected to the wrist pin and knife bar.

24. A mowing machine according to claim 22, in which the sleeve is rotatably mounted on the shaft to adapt the angle of approach of the cutter bar to be varied, and means for varying the angle of the cutter bar including an arm on the sleeve and a lever pivoted to said first hanger bar and connected to the arm.

25. A mowing machine according to claim 22, in which the cutter bar is connected to the sleeve for pivotal movement about an axis extending longitudinally of the machine, and means by which the cutter bar may be rocked upwardly or downwardly on its pivot.

26. A mowing machine according to claim 22, in which the cutter bar is connected to the sleeve for pivotal movement about an axis extending longitudinally of the machine, in which the sleeve is rotatably connected to the shaft to adapt the angle of approach of the cutter bar to be varied, means by which the cutter bar may be rocked upwardly or downwardly on its pivot, and means by which the sleeve may be turned to vary the angle of approach of the cutter bar.

27. A mowing machine comprising a wheel supported frame, a hanger connected to the frame for vertical adjustment with relation thereto, a cutter bar connected to the hanger for vertical adjustment therewith and for swinging adjustment with relation thereto, means for adjusting the hanger, and means for adjusting the cutter bar adapted to be actuated by and independently of said first means.

28. A mowing machine according to claim 27, in which the hanger and cutter bar adjusting means comprise levers pivoted to the frame, means connecting the respective levers to the hanger and cutter bar, and means connecting the levers to adapt one to be moved by the other and to adapt one to be moved independently of the other.

29. A mowing machine according to claim 27, in which the hanger and cutter bar adjusting means comprise levers pivoted to the frame, means connecting the respective levers to the hanger and cutter bar, a link pivotally connected to one of the levers and having a pin and slot connection with the other, and a contractile spring connected to the frame and to the lever connected to the cutter bar and tending to counterbalance the cutter bar.

30. A mowing machine according to claim 27, in which the hanger and cutter bar adjusting means comprise levers pivoted to the frame, means connecting the respective levers to the hanger and cutter bar, a link pivotally connected to one of the levers and having a pin and slot connection with the other, and means for securing the lever connected to the hanger against accidental movement.

31. In a mowing machine according to claim 27, means for operating the cutter bar, and means under the control of the means for adjusting the hanger for rendering said operating means inoperative.

32. A mowing machine comprising a wheel supported frame, a hanger pivoted to the frame, a cutter bar pivoted to the hanger, a lever pivoted between its ends on the frame, a link pivoted to the hanger and having a pin and slot connection with one arm of the lever at a distance from the pivot of the lever less than the distance between the pivot of the hanger and the point of connection of the link with the hanger, a second lever pivoted between its ends on the frame, means connecting one arm of said second lever to the cutter bar, and means connecting the other arms of the levers.

33. A mowing machine according to claim 32, in which the means connecting said other arms of the levers comprises a link pivotally connected to one of the levers and having a pin and slot connection with the other.

34. A mowing machine according to claim 32, in which the means connecting said second lever to the cutter bar comprises a lever pivoted between its ends to the hanger and having one of its arms provided with a flange, a series of connected links connected to said lever arm below the flange thereof and connected to the cutter bar, and a link connected to said second lever and to the other arm of the lever pivoted to the hanger.

35. A mowing machine comprising a wheel supported frame, a hanger pivoted to the frame, a cutter bar pivoted to the hanger, a lever pivoted between its ends on the hanger at one side of the pivot of the cutter bar, said lever having one of its arms provided with a flange, a series of links connected to said lever arm below the flange and connected to the cutter bar at the opposite side of the pivot of the cutter bar, a second lever pivoted between its ends on the frame and connected at one end to the other arm of said first lever, said levers and links providing means by which the hanger may be raised and the cutter bar then folded, and means connected to the hanger and frame to limit the distance through which the hanger may be raised by said second lever.

36. A mowing machine according to claim 35, in which said means comprises a link located between the hanger and frame and having a pivotal connection with one of said parts and a pin and slot connection with the other.

37. A mowing machine according to claim 35, in which said means comprises an arm pivoted to the frame, a link pivoted to the hanger and having a pin and slot connection with the arm, a lever fixed to the pivot of the arm, a link connecting said second and last levers and having a loose connection with one of them, and means for holding said last lever against accidental movement, said levers, arm and links providing means by which the hangers may be raised to a higher point and the cutter bar then folded.

38. The combination of a wheel supported frame, a single cutter operating mechanism carried by the frame, means carried by the frame for supporting a front cutting unit, separate means carried by the frame for supporting a side cutting unit, said operating mechanism being disposed in relation to said supporting means so as to drive a cutting unit attached to either of said supporting means.

39. The combination of a wheel supported frame, cutter operating mechanism carried by the frame, means carried by the frame for supporting a front cutting unit, means carried by the frame for supporting a side cutting unit, said operating mechanism being disposed in relation to said supporting means so as to drive a cutting unit attached to either of said supporting means and common operating means carried by the frame for adjusting a cutting unit connected thereto by either of said supporting means.

40. A mowing machine comprising a wheel supported frame, a cutter bar including a knife bar, a coupling having the cutter bar connected thereto and rockable about a pivot coincident with the axis of the wheels to adjust the cutter bar upwardly or downwardly, a gear rotatable about said axis and driven from the wheels, a shaft carried by the coupling and having a driving connection with the knife bar, a pair of gears rotatably mounted on the coupling, one gear of said pair engaging said first gear, a gear fixed to the shaft and engaging the other gear of said pair, a ratchet clutch connecting the gears of said pair, means operable to render the ratchet clutch inoperative to connect the gears of said pair, and means by which said coupling may be rocked to adjust the cutter bar.

41. A mowing machine according to claim 40, having means operable by said coupling rocking means to operate the means for rendering the ratchet clutch inoperative.

42. A mowing machine comprising an arched frame having the lower ends of its side bars provided with recessed bearings, spindles carried by the bearings and extending across their recesses and outwardly beyond the side bars, traction wheels mounted on those portions of the spindles extending outwardly beyond the side bars, hangers pivoted on those portions of the spindles extending across the recesses of the bearings, a cutter carried by the hangers, and means carried by the frame and connected to the hangers for rocking the latter to adjust the cutter with relation to the ground.

43. The combination of a wheel supported frame, a hanger mounted on the frame and having separate connecting means for attachment to a front cutter unit or to a side cutter unit respectively to be carried by the frame, and a single operating mechanism for driving either of said cutting mechanisms carried by the hanger and driven from the wheels.

44. The combination of a wheel supported frame, a hanger mounted on the frame and extending longitudinally thereof, said hanger having attachment means for connection to a front cutter and other attachment means for connection to a side cutter, a second hanger having means for attachment to a side cutter only, wheel driven operating mechanism carried by the hanger and having a power transmitting element at the front end of the hanger, said power transmitting element being connectable to either a front or side cutter supported by the frame.

45. A mowing machine comprising a frame having top and side bars of which the top bar is hollow, spindles carried by the lower ends of the side bars and extending outwardly therefrom, gears having long hubs rotatably mounted on the spindles outwardly of the side bars, ground wheels journalled on the hubs outwardly of the gears, ratchets connecting the wheels and gears, a shaft journalled in the top bar, gears fixed to the shaft meshing with said first gears, a cutter bar including a knife bar, a hanger connected to the frame and having the cutter bar connected thereto, and knife bar operating mechanism carried by the hanger and driven by said gears.

46. A mowing machine comprising a wheel supported frame, a coupling connected to the frame for rocking movement about an axis coincident with the axis of the wheels, a cutter bar including a knife bar mounted on the coupling, a gear rotatable about said axis and driven from the wheels, a shaft carried by the coupling and having a driving connection with the knife bar, a pair of gears rotatably mounted on the coupling, one gear of said pair engaging said first gear and provided with shoulders and cams, pins slidable axially through the other gear of said pair and engaged by said shoulders, a spring normally holding the pins in the path of said shoulders, a gear fixed to the shaft and engaging said other gear of said pair, a cam fixed to the hanger, a lever mounted on the hanger for rocking and lateral movement with relation thereto, said lever when rocked engaging said cam and moved thereby laterally of the hanger, means connecting the pins to the lever for movement out of the path of said shoulders by the lateral movement of the lever, and means for operating the lever carried by the frame.

MIKE HOLT NEWLIN.